R. HICKISH.
GREASE CUP.
APPLICATION FILED FEB. 3, 1912.

1,043,234.

Patented Nov. 5, 1912.

WITNESSES

INVENTOR
Robert Hickish
BY Sigmund Herzog
his ATTORNEY

UNITED STATES PATENT OFFICE.

ROBERT HICKISH, OF TUCKAHOE, NEW YORK.

GREASE-CUP.

1,043,234.　　　　Specification of Letters Patent.　　Patented Nov. 5, 1912.

Application filed February 3, 1912. Serial No. 675,204.

*To all whom it may concern:*

Be it known that I, ROBERT HICKISH, a subject of the King of Hungary, and resident of Tuckahoe, in the county of Westchester and State of New York, have invented certain new and useful Improvements in Grease-Cups, of which the following is a specification.

The present invention relates to grease cups.

One of the objects of the invention is to provide a grease cup, which discharges automatically the lubricant, with means whereby the automatic operation of the same is arrested and the lubricant is forced to the parts to be lubricated by manually operating the discharging means of the same.

Another object of the invention is to construct a grease cup which is provided with a simple and inexpensive means whereby the cup can be refilled with lubricating material without unscrewing the same from the part to be lubricated, and without disengaging from each other any of the parts forming said cup.

With these and other objects in view, which will appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1:
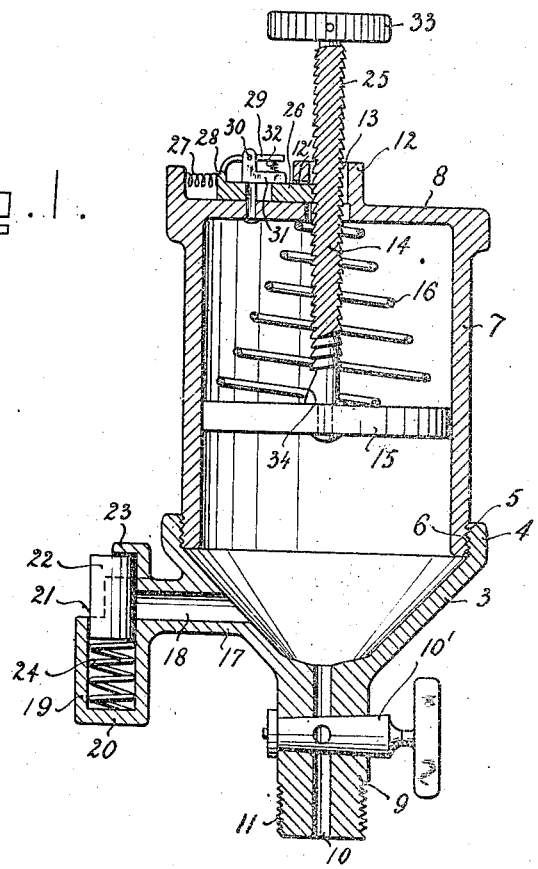
Figure 2:
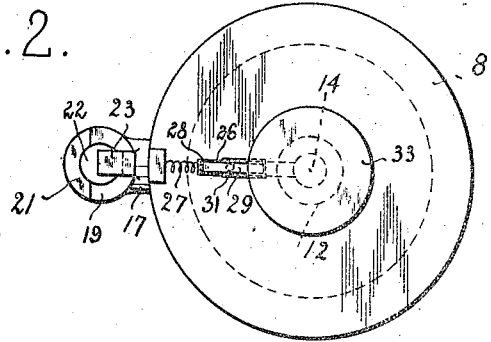

Figure 1 is a vertical central section of a grease cup constructed in accordance with the present invention, and Fig. 2 is a plan view of the same.

In the drawings, the numeral 3 indicates the base of the cup which is provided with a cylindrical flange portion 4, the inner face of which is screw threaded, as shown at 5, which threads mesh with the screw threads 6 of the grease cup body 7. This body comprises a tubular member, which is open at its lower end and closed at its upper end by a cover 8, which latter may be made integral with the body portion of the cup, or may be fastened thereto in any suitable manner. The base portion 3 of the cup is provided with a centrally arranged stem 9, throughout which leads a passage 10 to the interior of the grease cup. The passage 10 is controlled by a valve plug 10'. The stem 9 is screw threaded externally, as shown at 11, for attaching the grease cup to the bearing or other parts to be lubricated. A centrally arranged tubular extension 12 upon the cover 8 communicates through a hole 13 in said cover with the interior of the grease cup. Through this opening 13 projects the plunger rod 14, which carries on its lower end a piston 15, snugly fitting the inner surface of the body portion 7 of the grease cup and resting upon the surface of the grease. A helical spring 16 bears against the inner surface of the cover portion 8 and the piston 15, keeping thereby the piston down against the grease at all times to insure a constant discharge of the same from the cup.

Upon the side of the base portion of the cup is formed a cylindrical extension 17, in which is formed a passage 18, leading to the interior of the cup. At the outer end of this extension is arranged a downwardly extending tubular valve casing 19, which is provided at its lower end with a bottom 20, while its upper end is open for a purpose to be described. At this upper end the valve casing is recessed, as shown at 21, which recess extends down to the lowermost level of the passage 18. A cylindrical valve 22 is seated in the valve casing, and kept therein by means of a stop 23, attached to the upper end of said valve casing. A spring 24, bearing against the bottom 20 of the valve casing and the valve, forces said valve against the stop 23, closing thereby the passage 18 in the extension 17 of the base.

The plunger rod 14 is provided almost throughout its length with ratchet screw threads 25, which are adapted to be engaged by a detent 26. The detent is slidably arranged upon the cover portion 8 of the cup, projects through an opening 12' in the tubular portion 12, and is kept in engagement with said ratchet screw threads by means of a spring 27, arranged in any suitable manner upon the cover 8. The detent 26 is provided at its rear end with a lug 28, coöperating with the bellcrank lever 29, which is fulcrumed at 30 to a brace 31, the latter being supported by the cover portion 8, and kept by means of a spring 32 in contact with the lug 28. The spring 32 is attached to the bellcrank lever 29 and to the brace 31. A knob 33 is secured to the upper end of the plunger rod 14, to facilitate the rotation of the same.

The operation of the device is as follows: In order to fill the cup with lubricating material, the valve 22 is forced downward by the end of the stem of the grease pump until said stem can be inserted into the passage 18. The passage 10 leading from the interior of the cup to the object to be lubricated is then closed by the plug 10', after which the pump is operated. As the lubricating material is now forced into the grease cup, the piston 15 will be caused to move upward against the action of the spring 16; the screw threads 25 of the stem 14 will act as ratchet teeth, and be engaged, one after the other, with the detent 26, which holds the piston in any intermediate position, and prevents the spring 16 from forcing the piston 15 toward the base. At the end of the upward movement of the piston 15, the enlarged end 34 of the plunger rod forces the detent outward, whereby the spring 32 which tends to raise the substantially horizontal arm of the bellcrank lever 29, engages the latter with the inner face of the lug 28, keeping thereby the detent out of the path of the ratchet screw threads. In pulling out the stem of the grease pump from the passage 18 in the extension 17, the valve 22 will be automatically brought in its closing position. As soon as the passage 10 is opened, the lubrication proceeds, and the piston 15 starts to descend toward the base of the cup. When the piston reaches its lowermost position, the knob 33 will force the substantially horizontal arm of the bellcrank 29 downward, and thus disengage the same from the lug 28, whereby the spring 27 is left free to act, forcing thus the detent into engagement with the ratchet screw threads, whereby the device is ready for refilling.

If it is intended to stop the automatic, forced feeding of the lubricating material at any intermediate point of the movement of the piston, it is only necessary to depress the substantially horizontal arm of the bellcrank lever 29, whereby the detent 26 will engage one of the ratchet screw threads of the plunger rod 14 and arrest the movement of the piston. Since thereby the spring 16 ceases to exert pressure upon the surface of the grease, the forced feeding of the same to the part to be lubricated will, of course, stop. If in these positions of the parts lubricating material is to be fed to the parts to be lubricated, the knob 33 is turned to the right, whereby the piston will move downward, the detent 26 acting then as a nut.

What I claim is:

In a grease cup, the combination with a base provided with an aperture for the passage of the grease to the bearing, of a closed tubular body detachably fastened to said base so as to form therewith the cup and having a centrally arranged opening in its cover, a piston operating in said body, a plunger rod attached to said piston passing through the opening in the cover of said tubular body and being provided with ratchet screw threads, a spring tending to force said piston toward said base, a spring pressed detent adapted to engage said ratchet screw threads for holding said piston against the action of said spring in intermediate positions between the uppermost and lowermost positions in said tubular body, and a knob attached to said plunger rod for facilitating the rotation of the latter and for automatically disengaging said detent from said screw threads when said piston reaches its lowermost position.

Signed at New York, in the county of New York and State of New York, this 25th day of February, A. D. 1911.

ROBERT HICKISH.

Witnesses:
SIGMUND HERZOG,
S. BIRNBAUM.